United States Patent [19]

Egami et al.

[11] Patent Number: 4,771,385
[45] Date of Patent: Sep. 13, 1988

[54] WORD RECOGNITION PROCESSING TIME REDUCTION SYSTEM USING WORD LENGTH AND HASH TECHNIQUE INVOLVING HEAD LETTERS

[75] Inventors: Kazunari Egami; Yasuo Nishijima; Tetsuo Umeda, all of Tokyo, Japan

[73] Assignee: NEC Corporation, Japan

[21] Appl. No.: 799,831

[22] Filed: Nov. 20, 1985

[30] Foreign Application Priority Data

Nov. 21, 1984 [JP] Japan .................................. 59-244544

[51] Int. Cl.$^4$ .......................... G06K 9/00; G06K 9/72; G06F 5/00
[52] U.S. Cl. ..................................... 364/419; 364/900
[58] Field of Search .............................. 382/57, 36–38; 364/419, 200 MS File, 900 MS File

[56] References Cited

U.S. PATENT DOCUMENTS

| | | | |
|---|---|---|---|
| 4,328,561 | 5/1982 | Convis et al. | 382/57 X |
| 4,418,423 | 11/1983 | Tsuji et al. | 382/40 |
| 4,498,148 | 2/1985 | Glickman | 364/900 |
| 4,503,514 | 3/1985 | Urquhart | 364/900 |
| 4,597,057 | 6/1986 | Snow | 364/900 |

*Primary Examiner*—Jerry Smith
*Assistant Examiner*—Clark A. Jablon
*Attorney, Agent, or Firm*—Laff, Whitesel, Conte & Saret

[57] ABSTRACT

A word recognition system compares an input word with words stored in a dictionary memory. The comparison is made on a basis of the number of letters in the input word in combination with the first few letters in the word. The first level of selection is made on a basis of the number of letters in the input word. The memory locations of words are chain linked on a basis of the letters at the head of the word so that a reading of one memory location automatically leads to the reading of another memory location responsive to a comparison of the first few letters.

9 Claims, 8 Drawing Sheets

WORD RECOGNITION PROCESSING TIME REDUCTION SYSTEM USING WORD LENGTH AND HASH TECHNIQUE INVOLVING HEAD LETTERS

BACKGROUND OF THE INVENTION

The present invention relates to a word recognition apparatus which recognizes an input word by comparing it with dictionary words prestored in a word dictionary memory. The input word may be extracted from a group of words printed on a document, the words being extracted by means of scanning or the like.

In this kind of word recognition apparatus, the input word, which is composed of a letter string, is compared with a great number of dictionary words in a dictionary memory. The dictionary word with the highest degree of resemblance to the input word is considered as a "recognition result."

In this case, it is not realistic to compare the input word with all of the dictionary words in the dictionary memory because this requires too much recognition time. Hence, the dictionary words which are to be compared must be restricted in number. In one prior art method, the recognition time has been restricted by reducing the number of dictionary words to be compared with the input word in accordance with the number of letters included in the input word (word length). For example, the comparison has been carried out with only dictionary words having $(n-2)$, $(n-1)$, n, $(n+1)$ and $(n+2)$ of the word length in relationship to a length n of the input word. Another prior art method has performed the restriction of time by selecting, at first, the dictionary words that have the same one head letter or the same two head letters as the input word.

The prior art, however, has the following disadvantages:

1. In case of prior art using the word length as a key:

If it is assumed that input words have the word length of two to twenty-five letters, the dictionary words can be grouped into twenty-four groups. However, in this case, a large problem arises by the distribution of word lengths of the dictionary words. For example, in the case of making a dictionary of city names, the word lengths of the dictionary words take a normal distribution with a peak at eight to ten letters. As a result, the number of the dictionary words have greatly varied word-length groups. It may occur that more than one-half of the dictionary words belong to only five word-length groups, centered around the word-length group at the peak in number. In such a case, if a DP matching method (as described in U.S. Pat. No. 4,418,423, for example) is utilized to make word-comparison, a great deal of time is necessary to recognize an input word. Accordingly, a shortening of the recognition time cannot be sufficiently achieved.

2. In case of prior art using the identification of the one or two head letters:

When the dictionary words are grouped on the basis of one head alphabet letter, twenty-six groups are maximally composed. In comparison with the recognition technique using the word length, a number of the dictionary words in each group is dispersed according to letter usage and does not take a normal distribution. However, there is a great problem that, if the head letter of the input word is not read, a correct recognition cannot be accomplished. Then, it is necessary to perform a comparison with all of the dictionary words.

When the dictionary words are grouped on the basis of head two letters, 676 ($26 \times 26$) groups are composed in the maximum number. Therefore, the dictionary words are much more dispersed. In this case, when the first head letter is not read, it is possible to access a certain dictionary word in the dictionary memory by using a second letter as a key. However, in this case, if the second head letter is also not read, it is necessary to make comparison with all of the dictionary words. Thus, the comparison-processing time depends upon the read-out result of the two head letters of the input word. If a character-reader makes an error, the input word cannot be compared with a correct group of the dictionary words.

SUMMARY OF THE INVENTION

Accordingly, it is an object of the present invention to provide a word recognition apparatus which restricts, very effectively, the number of dictionary words which have to be compared with an input word.

According to the present invention, there is provided a word recognition apparatus for recognizing an input word, which comprises a dictionary memory for storing dictionary words to be compared with the input word. A grouping means groups the content of the dictionary memory in accordance with the number of letters contained in the dictionary words. The memory location addresses of the dictionary memory are linked in accordance with the combination of a few letters contained in the dictionary words. A reading means is coupled with the grouping means and with the linking means for reading out the dictionary words from the dictionary memory in accordance with the number of letters contained in the input word and in accordance with the combination of a few head letters contained in the input word. A comparing means compares the input word with the dictionary words read-out by the reading means.

In the present invention, a dictionary word group is selected at first on the basis of a word length of the input word, which is the length of a string of letters. Then, dictionary words in the dictionary word group are chainingly read-out on the basis of a few head letters of the input word. The comparison matching between this read-out dictionary word with the input word enables a recognization of the input word.

Figure 1:
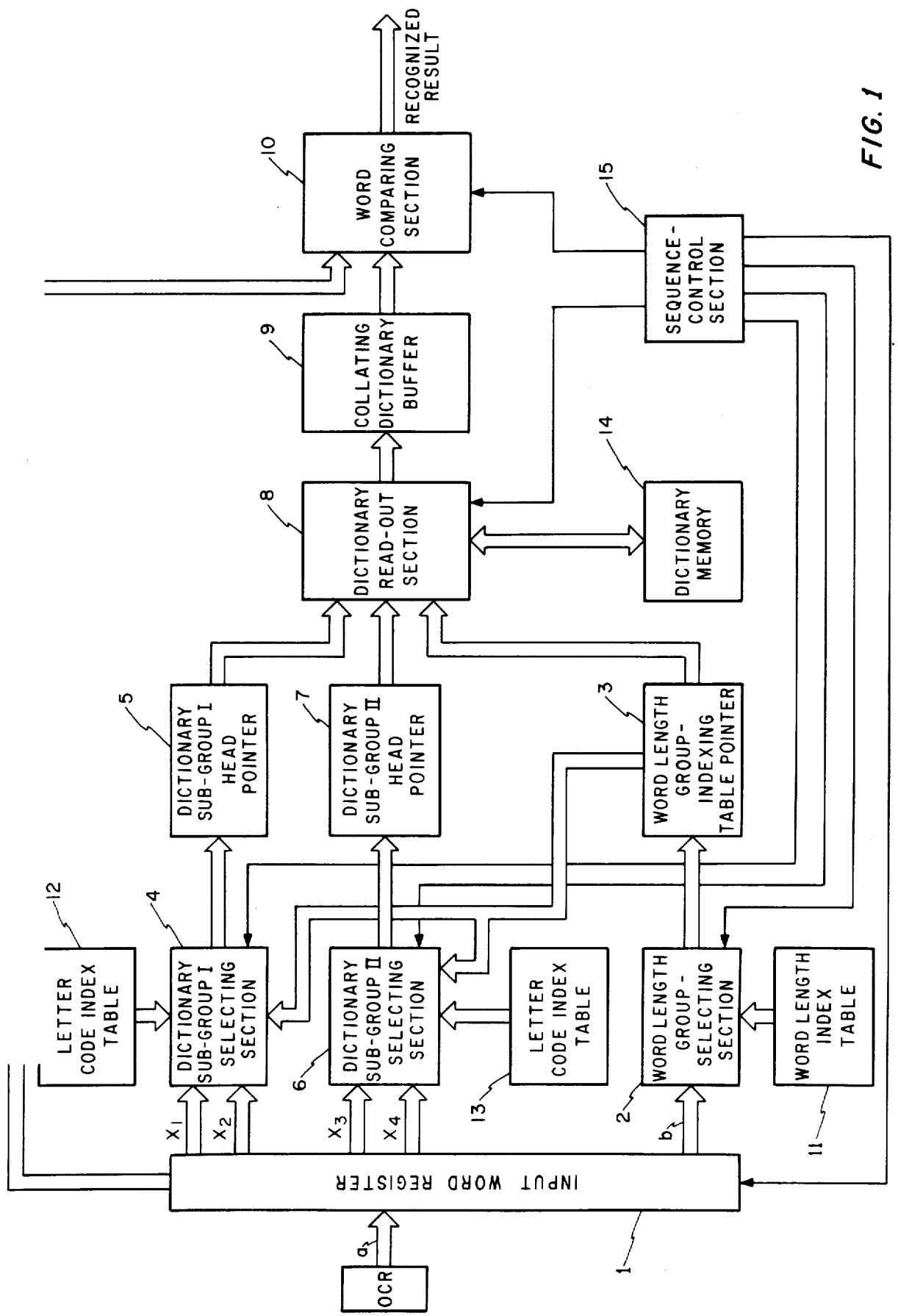
FIG. 1 shows a block diagram of an embodiment according to the present invention.
Figure 3:
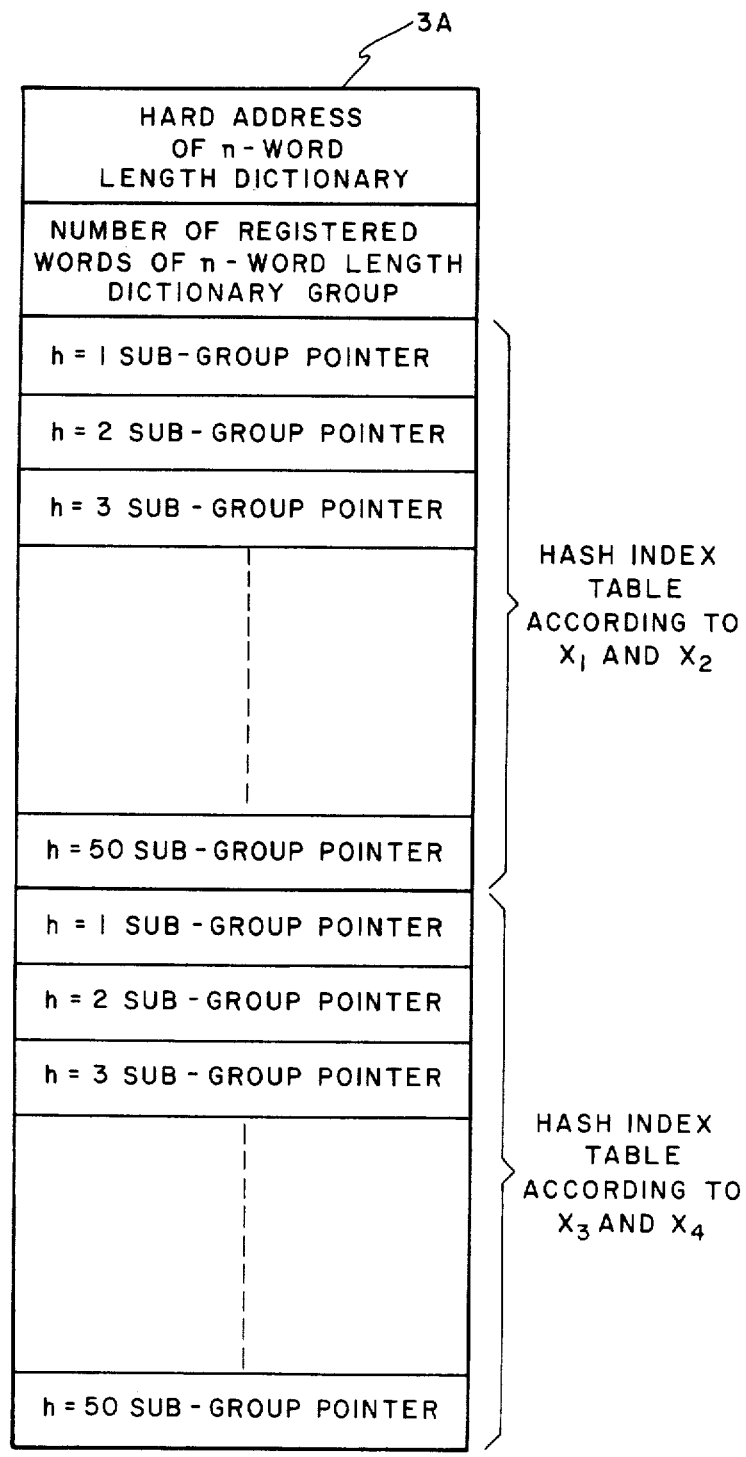
Figure 4:
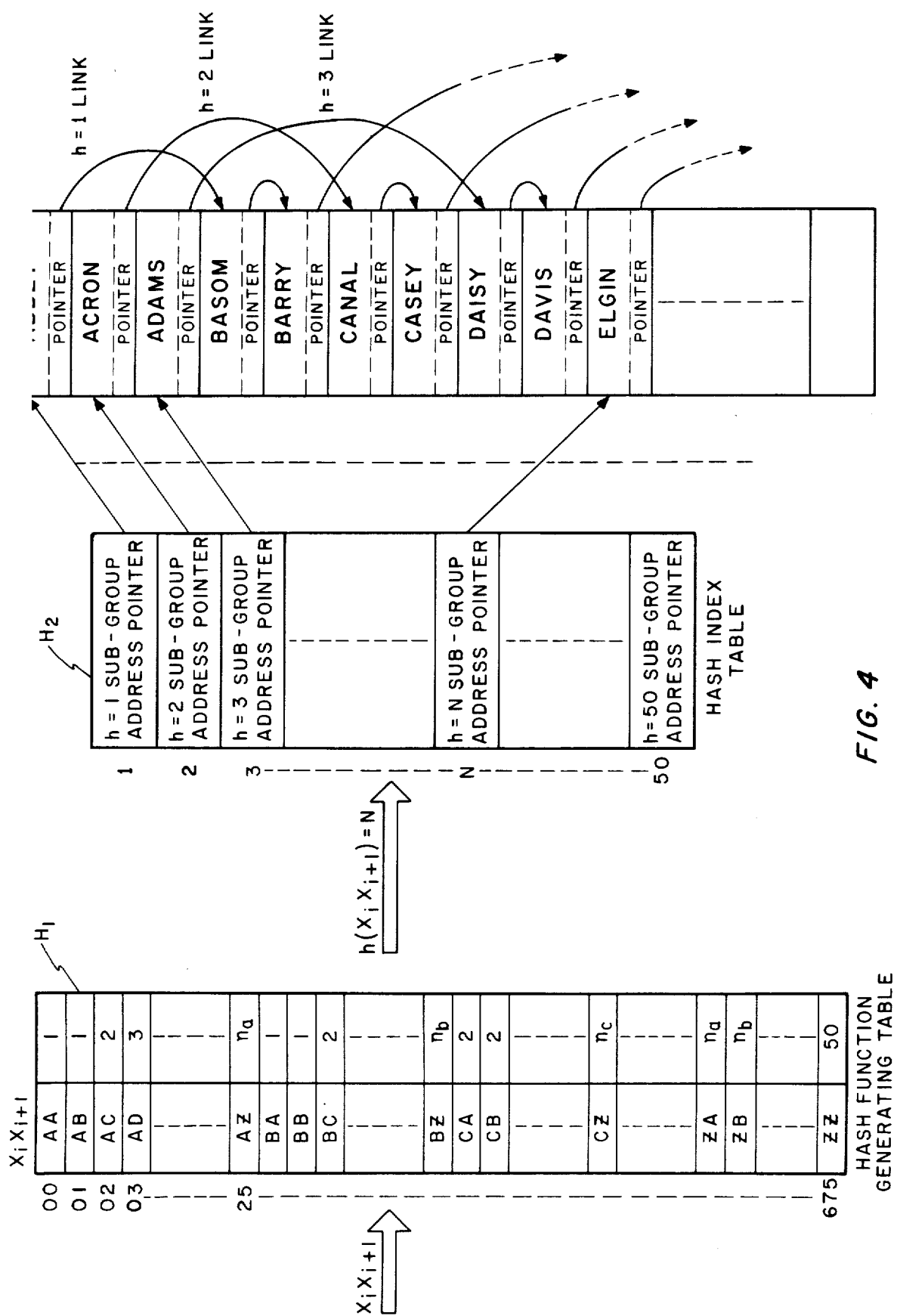
Figure 5:
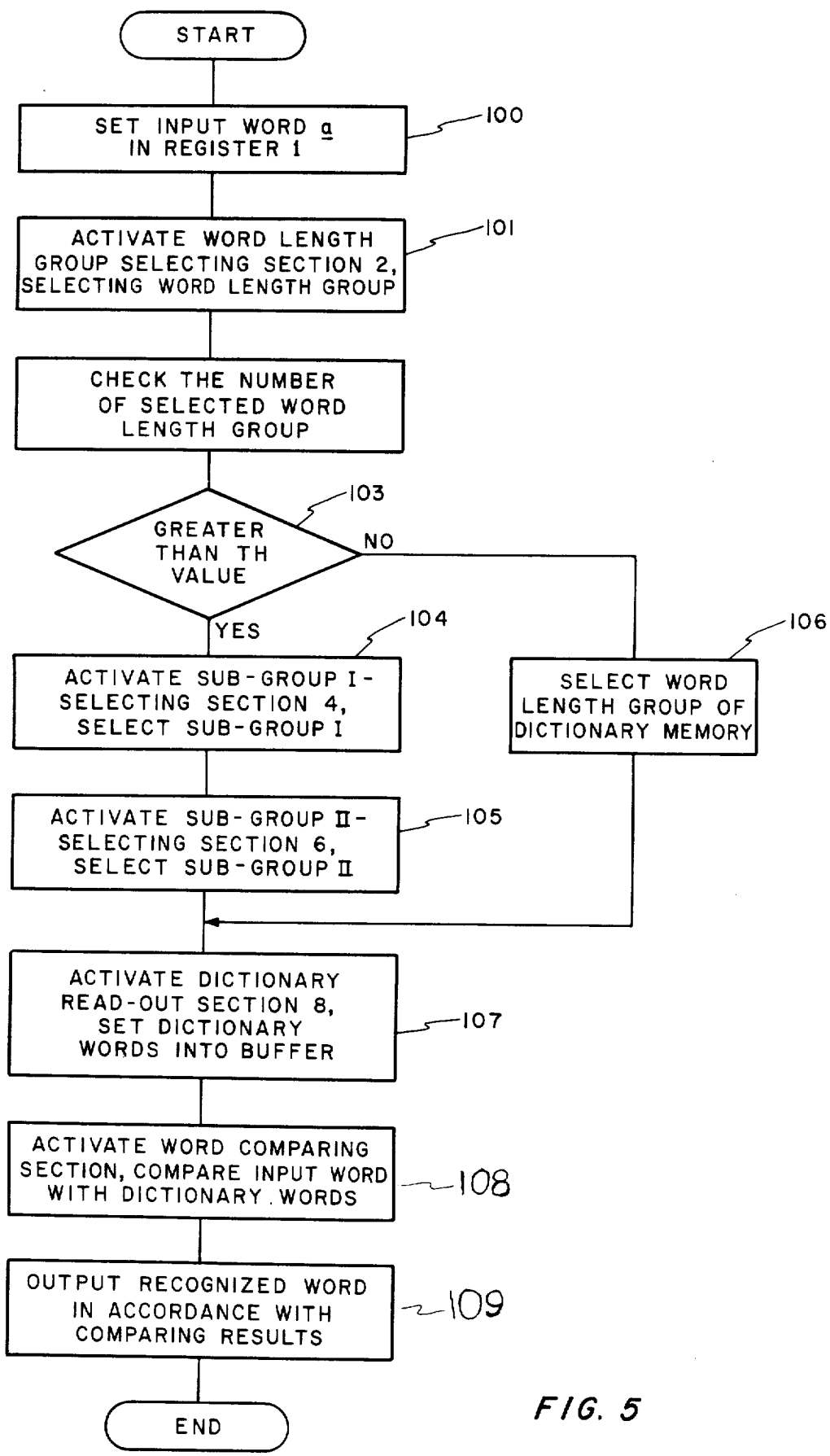
Figure 6:
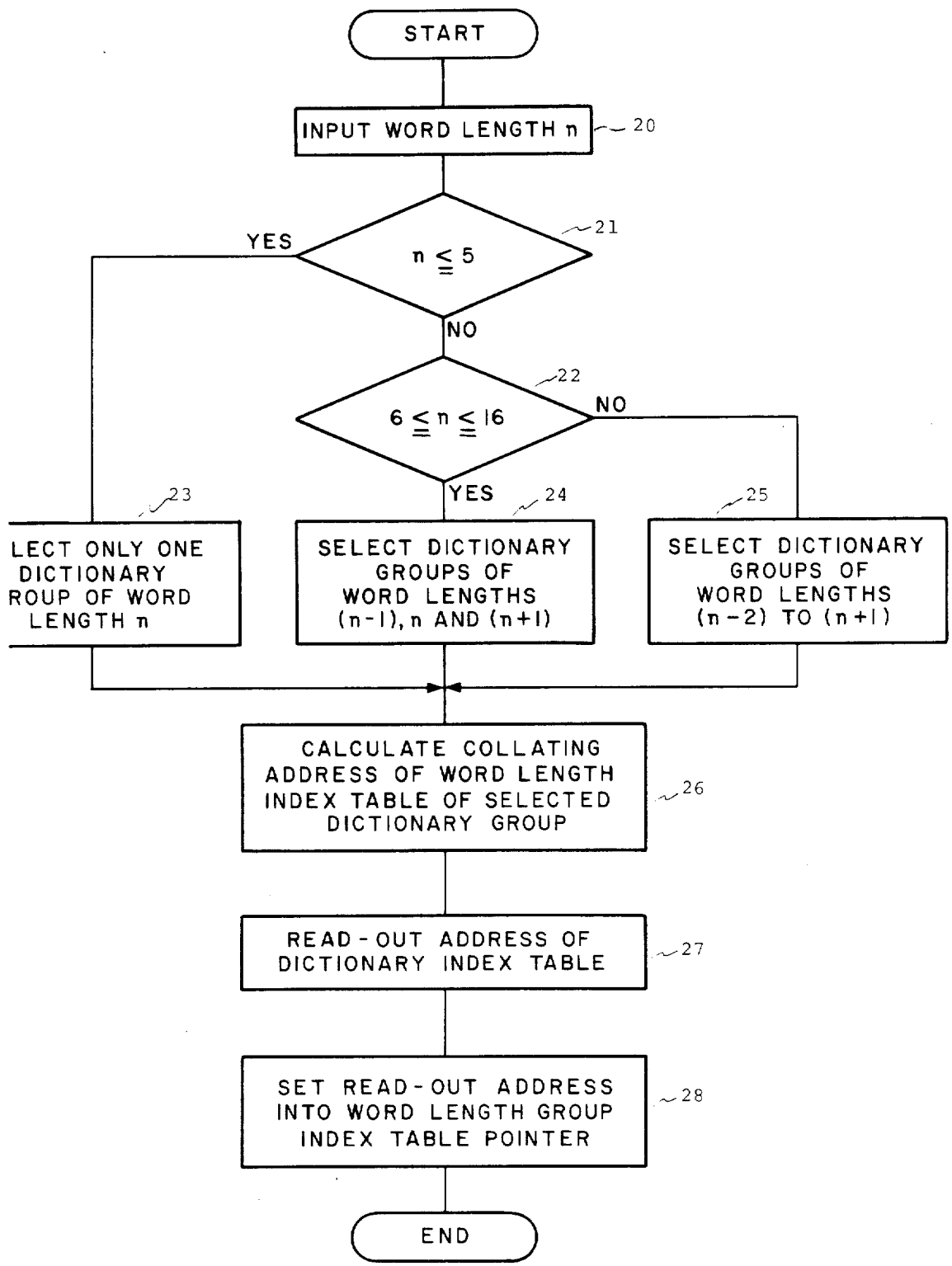
Figure 7:
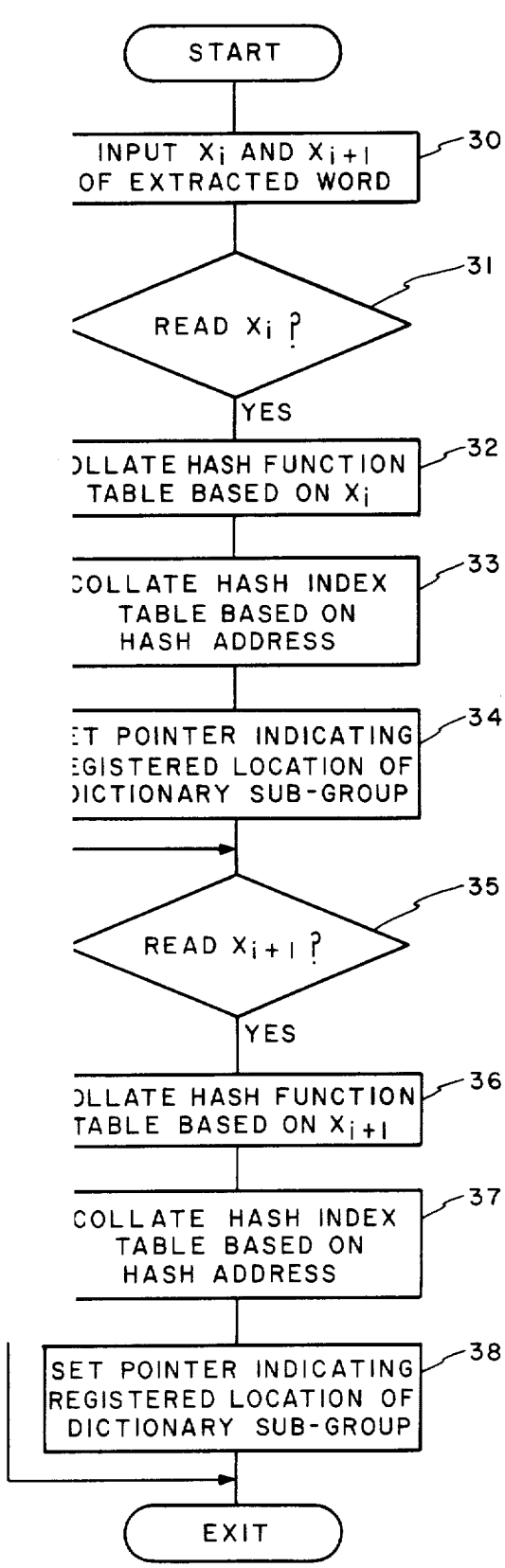
Figure 8:
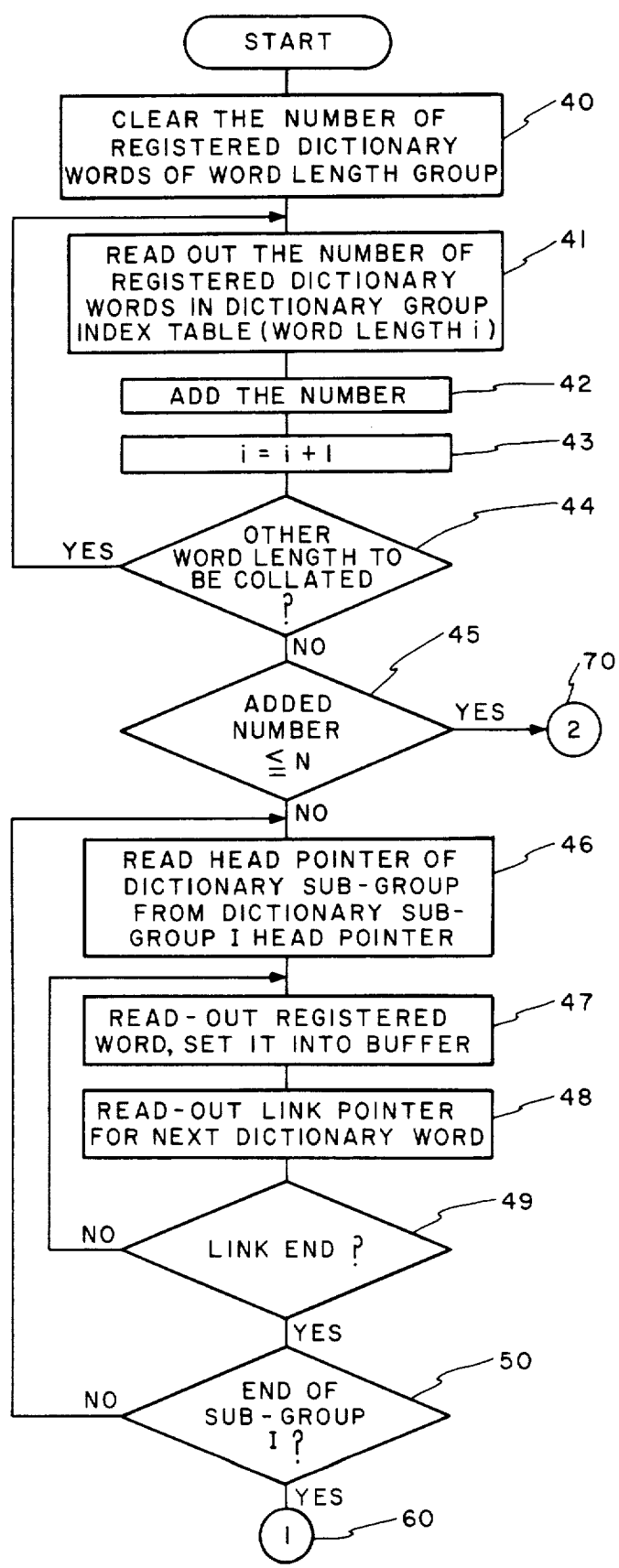
Figures 9, 10:
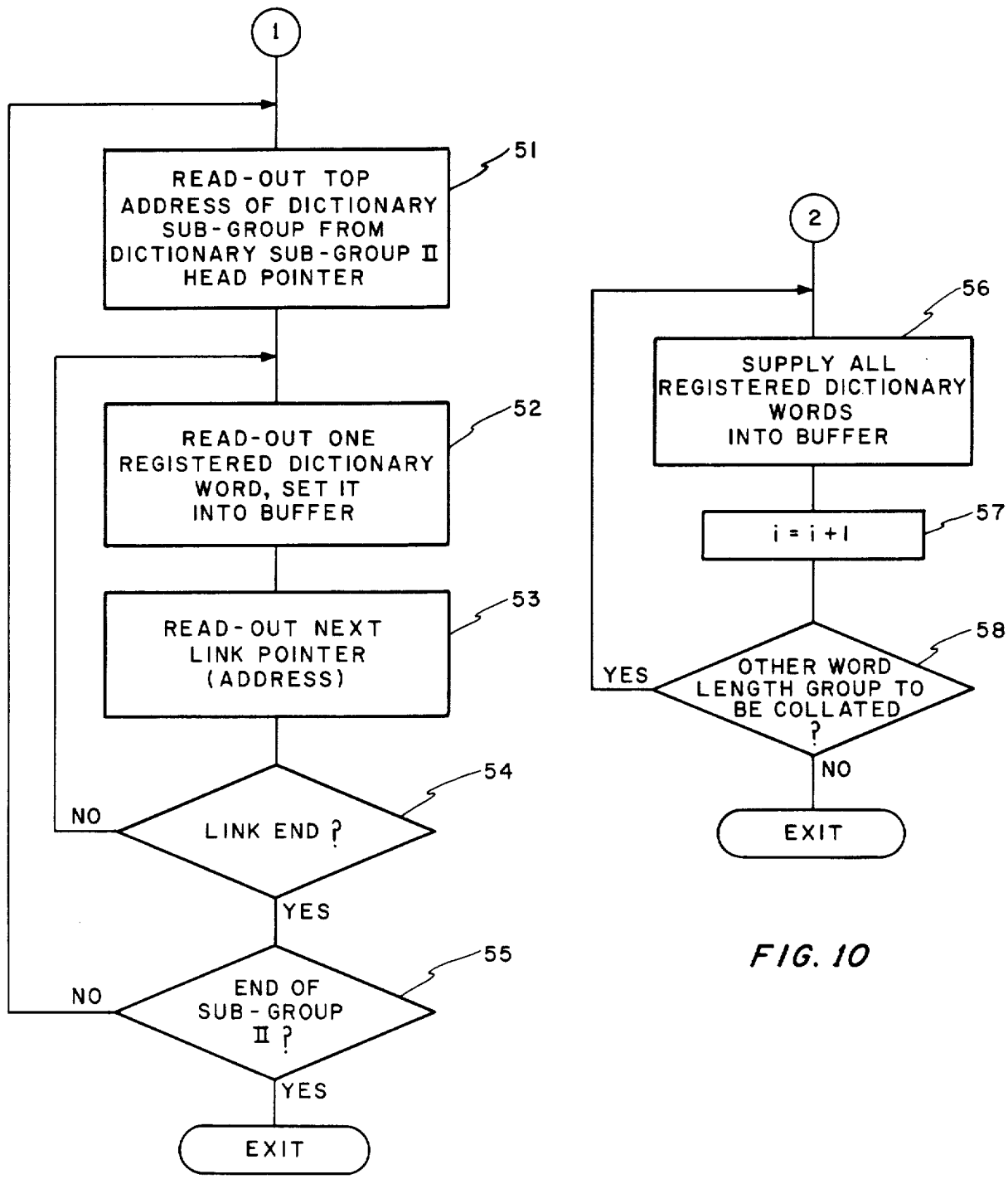

FIG. is a table constructional view showing the construction of a word index table;

FIG. 3 is a table constructional view showing an index table of word codes of dictionary groups stored in a word length group-indexing table pointer;

FIG. 4 is a table constructional view for describing a hash code;

FIG. 5 is a flowchart showing a sequence of controls in the embodiment, of FIG. 1;

FIG. 6 is a flowchart for describing the operation of a word length group selecting section 2;

FIG. 7 is a flowchart for describing the operations of a dictionary sub-group I selecting section and a dictionary sub-group II se section; and FIGS. 8-10 are flowcharts for describing the operations of a dictionary read-out section.

DESCRIPTION OF THE PREFERRED EMBODIMENT

Referring to FIG. 1, an embodiment of the present invention comprises an input word register 1 for temporarily storing a string of letters of the input word which are delivered from an optical character reader (OCR). A word length group-selecting section 2 receives a word-length data b of the input letter string. A word length group-indexing table pointer (buffer memory) 3 stores a word length index table address.

A dictionary sub-group I selecting section 4 selects one or a plurality of dictionary sub-groups which are to be compared with the input word, the comparison being made on the basis of two head letters in the input word. A dictionary sub-group I head pointer (buffer memory) 5 stores a head dictionary word address which is to be selected by the section 4. A dictionary sub-group II selecting section 6 selects one or a plurality of other dictionary sub-groups on the basis of the third and the fourth letters in the input word in order to avoid a mis-selection by the dictionary sub-group I selecting section 4.

A dictionary sub-group II head pointer (buffer memory) 7 stores a head dictionary word address to be selected by the section 6. A dictionary read-out section 8 reads out an aiming dictionary word from a dictionary memory 14 in response to the outputs of the sections 3, 5 and 7. A collating dictionary buffer 9 sets the aiming dictionary word read-out by the section 8. A word-comparing section 10 compares the input word with the read-out dictionary word set in the collating dictionary buffer 9.

A word length index table 11 is coupled to the section 2 to store addresses of a dictionary index table. Letter code index tables 12 and 13 are coupled to the sections 4 and 6, respectively, to store addresses of the dictionary index table of respective word lengths. The dictionary word memory 14 stores dictionary words and pointer information for linking two dictionary words.

Thus, this embodiment includes the grouping means (i.e., the word length group-selecting section 2, the dictionary sub-group I selecting section 4 and the dictionary sub-group II selecting section 6), linking means (i.e., the word length index table 11 and the letter code index tables 12 and 13), and comparing means (i.e., the dictionary read-out section 8, the collating dictionary buffer 9 and the word-comparing section 10). A sequence-control section 15 controls the flow sequences.

The operation of the embodiment shown in FIG. 1 will be described hereinafter.

An outline of the operation of the present invention is explained next. At first, the range of the dictionary words which is to be compared with the input word is restricted on the basis of the word length of the input word. When the number of the registered dictionary words contained in the restricted range is small, all of those dictionary words are compared with the input word. When the number of the dictionary words contained in the restricted range is large, the range of the dictionary memory which is to be compred is further restricted on the basis of an identification of two head letters or four head letters of the input word a.

At this time, in order to suppress, as much as possible, the possibility of comparing the input word with a mis-selected dictionary word group caused by an error in reading out the head letters, the letter code index tables 12 and 13 are composed as shown in FIGS. 3 and 4.

Namely, by employing a hash technique, which is a well-known grouping method, a hash function generating table H1 shown in FIG. 4 is provided. Table H1 groups the dictionary words of each word-length group into a maximum of fifty groups on the basis of two head letters $X_i$ and $X_{i+1}$ of the input word a. This table H1 is collated on the basis of two letters $X_i$ and $X_{i+1}$. Especially, under an error distribution in the case of reading alphabet-letters, letters which are mutually apt to be erroneously recognized are entered into the same group. The hash function generating table H1 generates a hash address code N ($=H(X_i X_{i+1})$) for collating a hash index table H2 shown in FIG. 4.

In response to the hash address code N, the hash index table H2 generates an address pointer indicating an address of the dictionary word memory 14. Particularly, this address corresponds to a dictionary word located at the top of a sub-group to be compared with the input word. In the embodiment, two letter sets ($X_1$, $X_2$) and ($X_3$, $X_4$) are independnetly used for selecting the sub-group, i.e., for making the hash address code. Therefore, with respect to two letters $X_1$ and $X_2$ and two letters $X_3$ and $X_4$ in the word, tables as shown in FIG. 4 are independently prepared.

The dictionary sub-group I selecting section selects one or a plurality of dictionary sub-groups on the basis of the two head letters. Further, the dictionary sub-group II selecting section 6 selects one or a plurality of dictionary sub-groups on the basis of the third and the fourth letters so as to avoid a mis-recognition by a selection of the word dictionary sub-groups in the dictionary sub-group I selecting section 4. Furthermore, each dictionary word stores in the dictionary word memory 14, as shown in a group dictionary H3 determined by the word length n in FIG. 4, is linked to another dictionary word to produce the dictionary sub-group. The top one of these linked words is stored in the hash index table H2.

Accordingly, the address pointer for the dictionary sub-group which is to be compared with the input word is drawn out of the hash index table H2 at the initial step. Then, all of the aiming dictionary words are sequentially read-out by using a linked relationship of the dictionary sub-group. To this end, the dictionary word memory 14 stores pointer information indicating a next linked dictionary word. There are two kinds of pointer information which are determined by sets ($X_1$ and $X_2$) and ($X_3$ and $X_4$), respectively. Consequently, all of the registered dictionary words composing the dictionary sub-group are read out and set into the collating buffer memory 9. The word comparing section 10 compares the in/put word (input letter string) a with the dictionary words set in the collating word buffer 9, the comparison being made by the DP matching method, for example.

Figure 2:
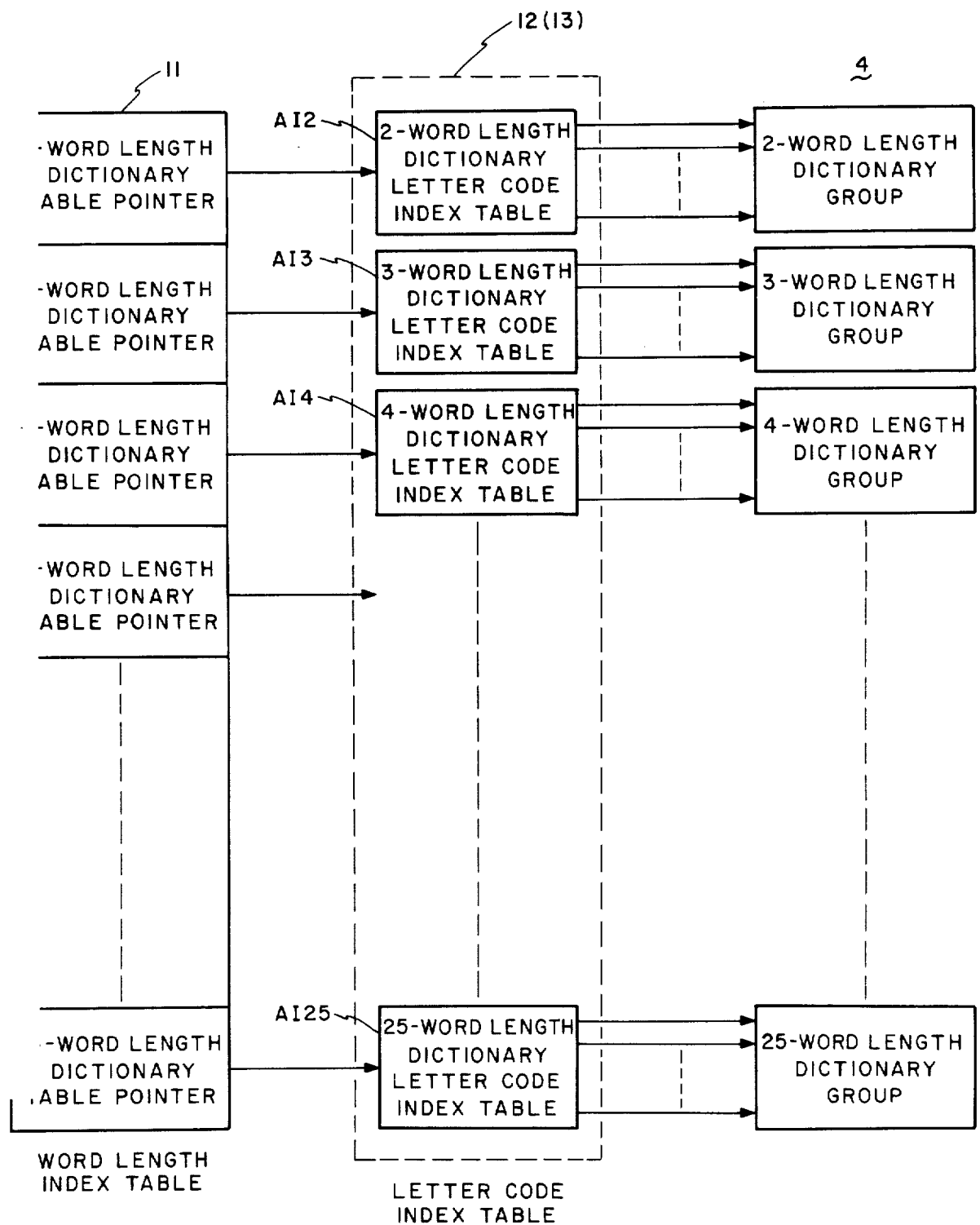

Next, the operation of the embodiment shown in FIG. 1 will be described with reference to flowcharts shown in FIGS. 5 through 10. As shown in FIG. 5, in a step 100, the sequence-control section 15 (FIG. 1) sets the input letter string (the input word) a ($X_1, X_2, \ldots, X_n$) into the input word register 1. Then, the sequence-control section 15 activates the word length group-selecting section 2, in a step 101, so as to input the data b which indicates the word length n of the input word a to the word length group selecting section 2. The section 2 obtains an address of an n-word length dictionary index table by collating the word length index table 11. The construction of the word length index table 11 is shown in FIG. 2. The word length index table 11 stores addresses of letter code index tables AI2 to AI25, which respectively correspond to two to twenty-five word-length dictionary groups.

The flow of the operation of the word-length group-selecting section 2 is shown in FIG. 6. At first, at step 20, the word length n is input. At the steps twenty-one to twenty-five, the dictionary word group of the word length n is selected in the dictionary word memory 14, in order to be compared. In the present embodiment, at a step 21, a decision is made as to whether n is or is not $n \leq 5$. If the answer is YES, the operation goes to a step 23. If the answer is NO, it goes to a step 22. Further, at the step 22, a decision is made as to whether n is or is not $n \leq 16$. If the answer is YES, the operation goes to a step 24. If the answer is NO, it goes to a step 25.

Under the decision $n \leq 5$, a dictionary group of the word length n is selected at the step 23. Three dictionary groups of word lengths $(n-1)$, n and $(n+1)$ are selected at the step 24 under the decision $6 \leq n \leq 16$. Five dictionary groups of word lengths $(n-2)$, $(n-1)$, n, $(n+1)$, $(n+2)$ are selected at the step 25 under the decision $17 \leq n \leq 25$.

Next, at a step 26, the collating address of the word length dictionary index table, shown in FIG. 2, is computed in relationship to each word length. At a step 27, the address of the letter code index table of each word length can be obtained. This address is stored in the word length group index table pointer 3 at a step 28.

Next, in the sequence flow shown in FIG. 5, the sequence control section 15 inputs a letter code index table address from the word length group index table pointer 3 so as to search for the number of dictionary words in the word length dictionary group which is registered in the table.

The detailed construction of the letter code index table is shown in FIG. 3. In steps 102 and 103 shown in FIG. 5, if the number of the registered dictionary words is smaller than a certain value, a method is employed for comparing the input word with all the dictionary words in the word length dictionary group. If the number of the registered dictionary word is larger than a certain value, as shown at steps 104 and 105, the dictionary sub-group I selecting section 4 and the dictionary sub-group II selecting section 6 are sequentially activated, so as to further restrict the number of dictionary words. The dictionary sub-group I selecting section 4 restricts the number of the dictionary words, i.e., a range of the dictionary groups defined by the word length on the basis of the two head letters $X_1$ and $X_2$ of the input word a.

The flow of the operation of the dictionary sub-group I selecting section 4 is shown in FIG. 7. At first, at a step 30, in case of $i=1$, the letters $X_1$ and $X_2$ are input. At a step 31, they can be checked to be read out or not read. If $X_1$ is read out, a dictionary sub-group including a dictionary word having $X_1$ within two head letters is picked up for comparing.

In order to obtain the address where the dictionary sub-group is registered, at a step 32, reference is made to the hash function generating table H1 shown in FIG. 4. The addressing of the hash function generating table H1 means the checking of a hash function $h(26 \cdot X_i + X_{i+1})$ under the numeric values of $0, 1, \ldots$, twenty-five which are determined by respective letters A, B, ..., Z. It is possible to obtain the hash address code of the dictionary sub-group having $X_1$, in either one of the two head letters, by referring to the hash function generating table H1 in relationship to $X_1A, X_1B, \ldots, X_1Z$. In this case, when hash addresses are overlapped, either one of the overlapped has addresses if left.

As shown in the hash index table H2, of the present embodiment, fifty dictionary groups are provided for each group of the word length n. The hash function generating table H1 is designated to obtain fifty codes, as the hash addresses. At a step 33, the hash index table H2 is referred to, on the basis of the hash address code. At a step 34, the dictionary sub-group I selecting section 4 inputs a pointer indicating a head location of the dictionary sub-group and sequentially sets the pointer in the dictionary sub-group I head pointer 5.

Upon a completion of the process as to $X_1$, the same process is carried out for $X_2$ at steps thirty-five through thirty-eight. At these steps, $X_2A, X_2B, \ldots, X_2Z$, hash function values are searched. Then, a head pointer of a dictionary sub-group is input to set it in the dictionry sub-group I head pointer 5.

By the above-stated operation, the range of the dictionary which is to be compared is further restricted on the basis of the two head letters $X_1$ and $X_2$ of the input word a. If one letter of the two head letters is not read out, the area of the dictionary sub-group is made narrower. Further, if an error is made in the remaining one letter, there is a drawback of dropping the dictionary range which is to be compared. Accordingly, in order to suppress, as much as possible, the probability of dropping the dictionary range to be compared, with respect to the third and the fourth letters $X_3$ and $X_4$ of the input word a, a dictionary sub-group can be selected by the dictionary sub-group II selecting section 6, by a process which is quite similar to the foregoing process.

The hash function generating table H1 shown in FIG. 4 for $X_1$ and $X_2$ is commonly utilized in case of the third and fourth letters $X_3$ and $X_4$. A hash index table for the $X_3$ and $X_4$ is independnetly prepared as shown in FIG. 3. Other points for links are also prepared independently in the dictionary, so as to compose a chain of words. By this function, if at least one letter of four head letters of the input word a is correctly read out, the dictionary words are selected, in the dictionary memory to be compared, without dropping the dictionary range.

The head address pointer selected in accordance with the dictionary sub-group I and the head address pointer selected in accordance with the dictionary sub-group II are selected as a result of the above-stated process. These pointers are sent to the dictionary read out section 8. When the dictionary group is selected at steps 102 to 106 of the sequence flowchart shown in FIG. 5, the dictionary read out section 8 is activated at a step 107. The dictionary read out section 8 gives an input which is the selection result of the word length dictionary group from the word length group index table pointer (buffer memory) 3. The letter code index table 3A of the n-word length dictionary group is shown in FIG. 3.

The operation flowchart of the dictionary read out section 8 is shown in FIG. 8. At first, at a step 40, a counter is cleared preparatory to adding the number of the registered dictionary words in the word length dictionary groups. Next, at steps 40 to 44, the numbers of the registered words of all of the word length dictionary groups to be cmpared with the input word in the word length group indexing table pointer 3 are added.

At at step 45, when the added number is smaller than a word-collating allowable value N, the operation goes to a step 56 (FIG. 10) by way of a coupler 70. At steps 56 to 58, the registered words in all of the word length dictionary groups are read out and set in the collating dictionary buffer 9. On the other hand, at the step 45, if the added number exceeds the collating allowable value N, the operation goes to a step 46 shown in FIG. 8. In this case, the dictionary read out section 8 further selects the dictionary sub-group.

At the step 46, the dictionary read out section 8 serves to pick up the head pointer of one dictionary sub-group from the dictionary sub-group I head pointer (buffer memory) 5. For example, in the case of FIG. 4, a sub-group is selected where h=2 in the hash index table H2. The head pointer shows an address of the registered dictionary word "ACRON". AT a step 47, this registered dictionary word is read out and, at first, is set in the collating dictionary buffer 9.

Next, at a step 48, the pointer information indicating the address of a next linked dictionary word is picked out so as to decide whether a link is or is not continued. In case of a link end, a link end code, for example, (0 0 0 0)$_{16}$ is set instead of the pointer information. At a step 49, a decision is made as to whether or not the link comes to the link end. If the link is continued, the operation goes back to the step 47, where the next registered dictionary word is read out in response to the link information (pointer information) and is set in the collating dictionary buffer 9. At the steps 47 to 49, this process is continued until the link comes to the link end.

Upon completion of a reading out of the dictionary words with respect to one dictionary sub-group, at a step 50, there is given the decision as to whether the registration in the dictionary sub-group I is or is not completed. If not completed, the operation goes back to the step 46, where a next dictionary sub-group head pointer is read out from the dictionary sub-group I head pointer 5. The same processing is again carried out at the steps 47 to 49.

At the step 50, upon completion of the registering of the dictionary words in the dictionary sub-group I, at steps 51 to 55 shown in FIG. 9, the next sub-group head pointer is read out from the dictionary sub-group II head pointer (buffer memory) 7. The same processing with the dictionary sub-group I is repeated in relationship to this pointer. Consequently, when only one letter is correctly read out in four head letters of the input word a, the dictionary word is read out from the dictionary word memory by restricting the number of the dictionary words as much as possible without missing a correct sub-group. Desired dictionary words can be set in the collating dictionary buffer 9. If the dictionary word to be compared is prepred at the step 107 of the flowchart shown in FIG. 5, the word-comparing section 10 is activated at a step 108. Therefore, the word-comparing section 10 is only required to compare the input letter string of the input word a with dictionary words selected in minimum. Hence, it is possible to accomplish a high speed and accurate word comparing process. Accordingly, the word identical with the input word a is output at a step 109.

As described above, the present invention is designed to restrict the range of the dictionary memory by the word length of the input word delivered from the OCR or the like and simultaneously to further restrict the memory area by the identification of a few head letters of the input word.

Those who are skilled in the art will readily perceive how to modify the invention. Therefore, the appended claims are to be construed to cover all equivalent structures which fall within the true scope and spirit of the invention.

What is claimed is:

1. A word recognition apparatus for recognizing an input word containing a plurality of letters by comparing said input word with dictionary words, which comprises:

dictionary word storing means for storing a plurality of said dictionary words and linking information connecting two of said dictionary words, said dictionary words being classified into dictionary groups in accordance with the number of letters contained in each said dictionary word, said dictionary words and said linking information being read-out by corresponding addresses;

a first selecting means for selecting said dictionary groups in said dictionary word storing means in accordance with the number of letters contained in said input word;

second selecting means for means selecting one of said addresses of said dictionary word storing means in accordance with either one of two heads letters in said input word;

dictionary word reading means for reading out said dictionary word from the dictionary group selected by said first selecting means, in accordance with the address selected by said second selecting means, said dictionary word being successively read out in response to said linking information after reading in accordance with said address; and comparing means for comparing said input word with said dictionary word read out by said dictionary word reading means.

2. A process for recognizing and identifying unknown input words comprising the steps of:

(a) registering an input word having a length which is measured in terms of the number of letters in said input word and having a head comprised of a predetermined number of letters at the start of the words;

(b) storing dictionary words in locations with a dictionary memory, said locations being segregated by word length;

(c) producing a hash code in accordance with two letters contained in said head, said hash code being predetermined according to a combination of two letters;

(d) reading an address from address memory means in accordance with said hash code, said address memory means storing addresses indicative of locations in said dictionary memory;

(e) chain linking words at word storage locations in said dictionary memory according to said address read out by said address reading step (d);

(f) comparing said input word with a dictionary word having a length which is the same length as the length of the input word; and (g) searching through said dictionary words in the ordered sequence of said chain linking responsive to a finding that the dictionary word compared in step (f) is different from the input word.

3. A word recognition apparatus for recognizing an input word containing a plurality of letters by comparing said input word with dictionary words, said apparatus comprising:

dictionary word storing means for storing a plurality of said dictionary words and linking information connecting two of said dictionary words, said dictionary words being classified into dictionary groups in accordance with the number of letters contained in each of said dictionary words, said dictionary words and said linking information being read-out by corresponding addresses;

first selecting means for selecting said dictionary groups in said dictionary word storing means in accordance with the number of letters contained in said input word;

hash code producing means for producing a hash code in accordance with at least two head letters contained in said input word, said hash code being predetermined in accordance with a combination of two letters;

second selecting means for selecting one of the addresses of said dictionary word storing means in response to said hash code produced by said hash code producing means;

dictionary word reading means for reading out said dictionary word from the dictionary group selected by said first selecting means in accordance with the address selected by said second selected means, said dictionary word being successively read out in response to said linking information after reading in accordance with said address, and comparing means for comparing said input word with said dictionary word read out by said dictionary word reading means.

4. A word recognition system comprising input register means for storing input words, each of said words having a length measured in terms of the number of letters in said words and having a head comprised of a predetermined number of letters at the start of the words, dictionary memory means for storing dictionary words in locations which are segregated by word length, hash index table means storing addresses which are indicative of locations in said dictionary memory means, each of said addresses being predetermined in accordance with two letters, address reading means for reading an address from said hash index table means in response to the letters in said head, means for chain linking words in said dictionary word locations into an ordered search sequence according to said address read out by said address reading means, means for comparing each of said input words with said dictionary words of the same length, and means responsive to said comparing means finding that dictionary word is different from a compared input word for searching through said dictionary words in the ordered sequence of said chain linking.

5. The system of claim 4 wherein said chain linking means contains information relating to each stored dictionary word in another stored dictionary word.

6. The system of claim 4 and means responsive to said compared means finding that the compared dictionary word is the same as the input word for stopping said search through chain linked said dictionary words and for giving a word recognition signal.

7. A word recognition system comprising input register means for storing input words, each of said words having a length measured in terms of the number of letters in said words and having a head comprised of a predetermined number of letters at the start of the words, dictionary memory means storing dictionary words in locations which are segregated by word length, means for chain linking words in said dictionary word locations into an ordered search sequence according to the letters in said head, means responsive to said length of said input word for first addressing a general location in said dictionary memory means, means for thereafter addressing a specific location within said general location of said dictionary word responsive to either one of at least two letters in said input word, said two letters being in the head of said word, means for comparing each of said input words with said dictionary words of the same length, and means responsive to said comparing means finding that a dictionary word is different from a compared input word for searching through said dictionary words in the ordered sequence of said chain linking.

8. A process for recognizing and identifying unknown input words comprising the steps of:

(a) registered an input word having a length which is measured in terms of the number of letters in said word and having head comprised of a predetermined number of letters at the start of the words;

(b) storing dictionary words in locations within a dictionary memory, said locations being segregated by word length;

(c) chain linking words at word storage locations in said dictionary memory according to the letters in said head;

(d) comparing said input word with a dictionary word having a length which is the same length as the length of the input word;

(e) addressing a general location in said dictionary memory means, said general location being addressed in response to a hash function;

(f) thereafter addressing a specific location within said general location of said dictionary word, said specific location being addressed responsive to either one of at least two letters, said two letters being in the head of said word, and (g) searching through said dictionary words in the ordered sequence of said chain linking responsive to a finding that the dictionary word compared in step (d) is difference from the input word.

9. A word recognition apparatus for recognizing an input word containing a plurality of letters by comparing said input word with dictionary words, said apparatus comprising:

dictionary word storing means for storing a plurality of said dictionary words and linking information connecting two of said dictionary words, said dictionary words being classified into dictionary groups in accordance with the number of letters contained in each said dictionary word, said dictionary words and said linking information being read-out by corresponding addresses;

first selecting means for selecting said dictionary groups in said dictionary word storing means in accordance with the number of letters contained in said input word;

hash code storing means for storing hash codes, each of said hash codes being predetermined in accordance with a combination of two letters;

hash code reading means for reading a first hash code and a second hash code in response to first and second head letters contained in said input word and in response to third and fourth head letters contained in said input word, respectively;

second selecting means for selecting one of the addresses of said dictionary word storing means in accordance with said first said hash code;

third selecting means for selecting one of the addresses of said dictionary word storing means in accordance with said second hash code;

dictionary word reading means for reading out said dictionary word from the dictionary group selected by said first selecting means in accordance with the address selected by said second and third selecting means, said dictionary word being successively read out in response to said linking information after reading in accordance with said address; and comparing means for comparing said input word with said dictionary word read out by said dictionary word reading means.

* * * * *